(12) United States Patent
Husovska

(10) Patent No.: US 10,544,308 B2
(45) Date of Patent: Jan. 28, 2020

(54) COLORED SPECIAL EFFECT INKS

(71) Applicant: The Board of Trustees of Western Michigan University, Kalamazoo, MI (US)

(72) Inventor: Veronika Husovska, Kalamazoo, MI (US)

(73) Assignee: The Board of Trustees of Western Michigan University, Kalamazoo, MI (US)

( * ) Notice: Subject to any disclaimer, the term of this patent is extended or adjusted under 35 U.S.C. 154(b) by 246 days.

(21) Appl. No.: 15/533,110

(22) PCT Filed: Dec. 3, 2015

(86) PCT No.: PCT/US2015/063659
§ 371 (c)(1),
(2) Date: Jun. 5, 2017

(87) PCT Pub. No.: WO2016/090096
PCT Pub. Date: Jun. 9, 2016

(65) Prior Publication Data
US 2017/0362438 A1 Dec. 21, 2017

Related U.S. Application Data

(60) Provisional application No. 62/088,044, filed on Dec. 5, 2014.

(51) Int. Cl.
C09D 11/033 (2014.01)
C09D 11/037 (2014.01)
(Continued)

(52) U.S. Cl.
CPC ............. *C09C 1/0015* (2013.01); *C09C 1/00* (2013.01); *C09C 1/62* (2013.01); *C09D 11/033* (2013.01);
(Continued)

(58) Field of Classification Search
None
See application file for complete search history.

(56) References Cited

U.S. PATENT DOCUMENTS 5,474,603 A * 12/1995 Miyashita ............. C09D 11/18
106/31.33
5,747,049 A 5/1998 Tominaga
(Continued)

FOREIGN PATENT DOCUMENTS

CN 1327418 A 12/2001
CN 1589298 A 3/2005
(Continued)

OTHER PUBLICATIONS

European Search Report (Supplemental), European Phase Patent Application No. 15/865,497.01 , dated Jun. 15, 2018 (8 pages).
(Continued)

*Primary Examiner* — Helene Klemanski
(74) *Attorney, Agent, or Firm* — Price Heneveld LLP

(57) ABSTRACT

A colored special effect ink includes a special effect pigment and a colored pigment. The colored pigment is more hydrophobic than the special effect pigment, and the colored pigment is miscible in a solvent chosen from the group consisting of alcohols, ethers, esters, ketones, and water. The colored pigment optionally has a surface energy of less than 35 dynes/cm. A method for preparing the colored special effect ink and treating the colored pigment to form the colored special effect ink are also described.

18 Claims, 1 Drawing Sheet

(51) Int. Cl.
*C09D 11/322* (2014.01)
*C09C 1/00* (2006.01)
*C09C 1/62* (2006.01)

(52) U.S. Cl.
CPC .......... *C09D 11/037* (2013.01); *C09D 11/322* (2013.01); *C09C 2200/1054* (2013.01); *C09C 2200/403* (2013.01); *C09C 2200/405* (2013.01)

(56) References Cited

U.S. PATENT DOCUMENTS

| | | | |
|---|---|---|---|
| 6,042,815 A | 3/2000 | Kellner et al. | |
| 6,120,590 A | 9/2000 | Miyamoto et al. | |
| 6,325,845 B1* | 12/2001 | Kurihara | C09D 11/18 |
| | | | 106/31.65 |
| 6,372,036 B1* | 4/2002 | Pfaff | C09D 5/36 |
| | | | 106/415 |
| 6,398,862 B1* | 6/2002 | Hechler | C08K 9/02 |
| | | | 106/401 |
| 6,432,192 B1 | 8/2002 | Cook et al. | |
| 6,432,428 B1 | 8/2002 | Arquette et al. | |
| 6,561,713 B2* | 5/2003 | Sukhna | C09D 11/17 |
| | | | 401/196 |
| 6,616,741 B1* | 9/2003 | Sawa | C09D 11/17 |
| | | | 106/31.28 |
| 6,706,103 B2* | 3/2004 | Yoshimura | C09D 11/16 |
| | | | 106/31.6 |
| 7,105,585 B2 | 9/2006 | Schwartz | |
| 7,135,507 B2 | 11/2006 | Sexton | |
| 7,173,077 B2* | 2/2007 | Yoshimura | C09D 11/16 |
| | | | 523/161 |
| 7,947,126 B2 | 5/2011 | Teeley et al. | |
| 8,623,386 B2 | 1/2014 | Schlossman et al. | |
| 9,163,153 B2* | 10/2015 | Kwan | C09D 11/17 |
| 2003/0161801 A1 | 8/2003 | Yamasaki et al. | |
| 2003/0215281 A1* | 11/2003 | Sexton | C09D 11/03 |
| | | | 401/261 |
| 2005/0058669 A1 | 3/2005 | Krzysik et al. | |
| 2005/0186235 A1 | 8/2005 | Martin et al. | |
| 2005/0265943 A1 | 12/2005 | Geffroy-Hyland et al. | |
| 2007/0022901 A1* | 2/2007 | Kurze | C09D 11/037 |
| | | | 106/31.6 |
| 2007/0199478 A1 | 8/2007 | Schlegl et al. | |
| 2008/0257211 A1 | 10/2008 | Oriakhi | |
| 2010/0136065 A1 | 6/2010 | Schlossman et al. | |
| 2011/0139034 A1* | 6/2011 | Wczasek | A61K 8/11 |
| | | | 106/31.69 |
| 2017/0362438 A1 | 12/2017 | Husovska | |

FOREIGN PATENT DOCUMENTS

| | | |
|---|---|---|
| JP | 2001064117 A | 3/2001 |
| JP | 2002363032 A | 12/2002 |
| JP | 2005314258 A | 11/2005 |
| WO | 9723575 A1 | 7/1997 |
| WO | 2004104120 A1 | 12/2004 |

OTHER PUBLICATIONS

Flint Group Pigments, Pigment Portfolio, info.pigments@flintgrp.com, at least as early as Dec. 31, 2011 (2 pages).

Kobo Products, Inc., "Ingredients of Natural Origin, Asia Program," www.koboproducts.com, Technical Literature ref NatAsia-002, Apr. 29, 2016 (2 pages).

* cited by examiner

COLORED SPECIAL EFFECT INKS

CROSS-REFERENCE TO RELATED APPLICATIONS

This application is a National Stage application under 35 U.S.C. § 371 of PCT Application No. PCT/US2015/063659, filed on Dec. 3, 2015, which claims priority under 35 U.S.C. § 119(e) to U.S. Provisional Patent Application No. 62/088,044, filed on Dec. 5, 2014, entitled "COLORED SPECIAL EFFECT INKS," the entire disclosures of which are hereby incorporated herein by reference.

FIELD OF THE INVENTION

The present disclosure relates to colored special effect inks, and a method for preparing the same.

SUMMARY

One aspect of the present disclosure is a colored special effect ink, including a special effect pigment and a colored pigment. The colored pigment is more hydrophobic than the special effect pigment and is miscible in a solvent chosen from a group consisting of alcohols, ethers, esters, ketones, and water.

Another aspect of the present disclosure is a colored pigment for use in a colored special effect ink, wherein the colored pigment has a surface energy of less than 35 dynes per centimeter, and is miscible in a solvent chosen from the group consisting of alcohols, ethers, esters, ketones and water.

Yet another aspect of the present disclosure is a method of preparing a colored special effect ink, including the steps of dispersing a special effect pigment in a first solvent to form a special effect dispersion. A colored pigment is surface treated to form a treated colored pigment that is more hydrophobic than the special effect pigment. The treated colored pigment is dispersed in a second solvent to form a colored dispersion. The special effect dispersion and colored dispersion are combined.

These and other features, advantages, and objects of the present device will be further understood and appreciated by those skilled in the art upon studying the following specification, claims, and appended drawings.

DETAILED DESCRIPTION

Figure 1:
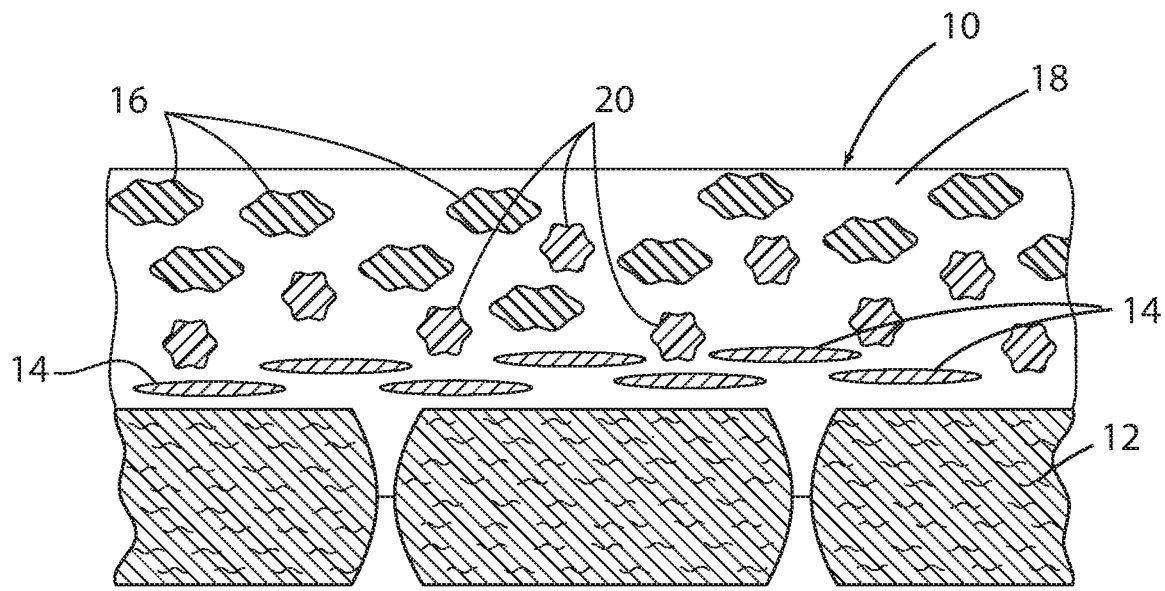
FIG. 1 is a cross sectional schematic view of a substrate with one embodiment a special effect ink applied to the substrate according to the present disclosure.

For purposes of description herein the terms "upper," "lower," "right," "left," "rear," "front," "vertical," "horizontal," and derivatives thereof shall relate to the special effect ink and its components as oriented in the cross sectional view of a printed substrate as shown in FIG. 1. However, it is to be understood that the special effect ink and its components may assume various alternative orientations and the methods for making the ink may include various step sequences, except where expressly specified to the contrary. It is also to be understood that the specific compositions, devices and processes illustrated in the attached drawings, and described in the following specification are simply exemplary embodiments of the inventive concepts defined in the appended claims. Hence, specific compositions, dimensions and other physical characteristics relating to the embodiments disclosed herein are not to be considered as limiting, unless the claims expressly state otherwise.

Figure 2:
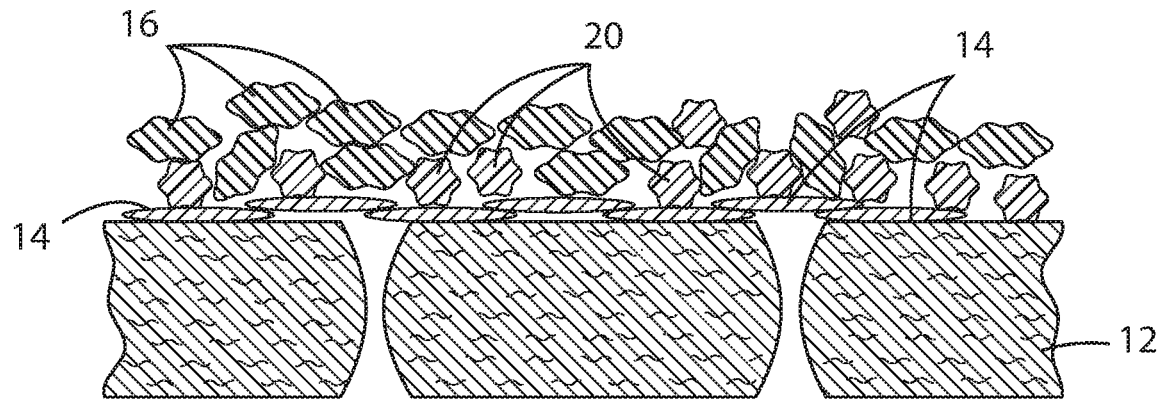
FIG. 2 is a cross sectional schematic view of the substrate with the special effect ink applied thereto as shown in FIG. 1, after drying of the special effect ink on the substrate.

As shown in the embodiment depicted in FIG. 1, a colored special effect ink 10 for applying to a substrate 12 includes a special effect pigment 14, a colored pigment 16, a solvent 18, and optionally one or more resins 20 or other additives. As shown in the embodiment depicted in FIG. 2, when dried, the solvent 18 is substantially evaporated from the colored special effect ink 10, leaving the special effect pigment 14, the colored pigment 16, and the optional resins 20 or additives on the substrate 12.

The colored special effect ink 10 as described herein is suitable for inks having both a colored appearance and a special effect, such as colored metallic inks, or colored pearlescent inks, and the ink 10 is particularly suitable for maintaining a desirable colored appearance even when used on porous substrates 12. As further described below, the colored special effect ink 10 described herein can also be formulated to have a low viscosity, preferably 10 centipoise (cps) or less, and to dry quickly, preferably being dry to the touch within 30 seconds, or more preferably within 15 seconds, after being applied to a substrate 12. Also as described below, the colored special effect ink 10 described herein can be formulated for use with various substrates 12 or with varying application methods, such as for use in a writing utensil or for printing on the substrate 12.

In one embodiment, the special effect pigment 14 is a metallic pigment, including without limitation an aluminum based pigment. In alternative embodiments, the special effect pigment 14 includes without limitation mica (natural or synthetic), bronze, copper, or silver. In certain applications, such as where the colored special effect ink 10 will be applied using a felt-tip type marker, a particle size of less than 10 microns is preferable for the special effect pigment 14. Some commercially available special effect pigments 14 can be purchased as pastes or dispersions of the special effect pigment 14 in a chosen or specified solvent 18. Aluminum pigment is traditionally used to give a silver metallic effect. When an aluminum pigment is used for the special effect pigment 14, the aluminum pigment can be leafing, non-leafing or vacuum metalized pigment ("VMP"). Generally, commercially available leafing and non-leafing metallic aluminum pigments are surface treated with a fatty acid to facilitate production and sizing of the particles, such as stearic acid. Non-limiting examples of suitable special effect pigments 14 for producing the colored special effect ink 10 described herein include the following products available from Silberline: SparkleBrite 011NL-PA (non-leafing aluminum pigment), EternaBrite 651-PA (leafing aluminum pigment), and StarBrite Reveal R4102-PA (vacuum metallized aluminum pigment, with the particle size optionally reduced via ultrasound processing).

The colored pigment 16 described herein for use in the colored special effect ink 10 provides coloring to the colored special effect ink 10, even after the ink 10 has dried on a substrate 12. The colored pigment 16 has a particle size of less than 10 microns, and more preferably has a submicron particle size, for example, a particle size of less than 5 microns, or less than 1 micron. The colored pigment 16 is also selected or treated to be more hydrophobic than the special effect pigment 14 with which it will be combined. In certain preferred embodiments, the colored pigment 16 has a surface energy of less than 45 dynes/cm, and in other embodiments the colored pigment has a surface energy of less than 35 dynes/cm.

It is desirable to use commercially available inkjet printing colored pigments 16 and other commercially available pigments to form colored special effect ink 10. However, when standard commercially available colored pigments 16 are combined with special effect pigments 14 in an ink of the desired viscosity, the commercially available colored pigments 14 tend to bleed through the substrate 12 when porous substrates 12 are used, leaving only the special effect pigment 14 on a top side of the substrate 12. For example, when previously available colored pigments are combined with a metallic pigment in an ink formulation and applied to the top side of a porous substrate, the metallic pigment remains on the top side of the substrate and the colored pigment tends to bleed through the porous substrate to its reverse side, leaving primarily metallic pigment on the top side of the substrate and colored pigment on the bottom side of the substrate. Examples of commercially available inkjet printing colored pigments 16 include Renol Red HF2B-HW30, Renol Red FGR-HW30, Renol Red F5RK-HW30, or Renol Carmine FBB-HW30, Hostaperm pigments, Hostaprint pigments, all available from Clariant GmbH, Macatawa Red Dry Toner available from the Flint Group, and lithol rubine powdered colored pigment.

As described above, the colored pigment 16 is selected or treated to be more hydrophobic than the special effect pigment 14 with which the colored pigment 16 will be combined. One method of treating the colored pigment 16 to make it more hydrophobic is to treat the colored pigment 16 with a hydrophobic surface treatment compound to form a hydrophobically treated color pigment 16, and to optionally grind the hydrophobically treated color pigment 16 using ultra-sonication to reduce its particle size. In one example, to surface treat the colored pigment 16 with oleic acid, the colored pigment 16 is placed in a vial and covered with oleic acid. To size the colored particles, an ultrasonic probe is then optionally placed in the vial and used for ultrasonication.

As used herein, the term "colored pigment" 16 includes colored pigments 16 that have been hydrophobically treated unless the context requires or indicates otherwise. The hydrophobically treated colored pigment 16 can be used as the colored pigment 16 to formulate the colored special effect ink 10 as described herein. Examples of suitable hydrophobic surface treatment compounds include dimethicone, methicone, carnauba wax, stearic acid, oleic acid, or another oil, fat, fatty acid, silicon, emulsifier, silicon, or wax to form the hydrophobically treated color pigment 16. In some embodiments, the hydrophobic surface treatment compound is selected to have an aliphatic tail that is longer than those present in any coating applied to the special effect pigment 14. For example, where an aluminum metallic pigment is surface treated with a compound having a 20-carbon long aliphatic tail, a hydrophobic surface treatment compound for the colored pigment 16 is optionally selected which has an aliphatic tail which is greater than 20-carbons long. The surface treatment described herein can be used to treat commercially available colored pigments, including without limitation those listed above, prior to adding the colored pigment 16 to the colored special effect ink 10 in order to render the colored pigment 16 more hydrophobic than the special effect pigment 14. In certain preferred embodiments, the hydrophobic surface treatment is from 1% to 50% of the weight of the colored pigment to which it is applied.

In one embodiment, the solvent 18 used in the colored special effect ink 10 is isopropyl alcohol, preferably in the range of about 10%-80% by weight of the ink. Alternative solvents 18 for use in the colored special effect ink 10 include: alcohols, including without limitation monohydric aliphatic alcohols, monohydric cyclic alcohols, polyhydric alcohols, ether alcohols, ethyl alcohol, isopropyl alcohol, and n-propyl alcohol; ethers; esters, including without limitation acetates and esters of hydroxyl acids; and ketones, including without limitation acetone and methyl ethyl ketone. The solvents 18 described herein are adjusted (in type and amount) to obtain the desired viscosity and drying time of the ink 10, and can be combined where compatible. The solvent 18 used is preferably one which will give the ink 10 the desired viscosity, and dry in the preferred time frame, and also preferably does not have an objectionable odor to users. The solvent 18 is also chosen to be compatible with the special effect pigment 14 and the colored pigment 16, and any coatings thereon.

Additionally, in some embodiments a resin 20 or other additive can be used in the formulation of the colored special effect ink 10, to give the colored special effect ink 10 desired properties. For example, resin 20 can be used to increase adhesion of the ink 10 to the desired substrate 12, and other additives used in ink production can also be used, such as adhesion promoters, binders, fragrances, anti-foaming agents, or others. Non-limiting examples of suitable resins 20 and additives include without limitation, ETHOCEL Standard 4 Premium available from the DOW Chemical Company, ETHOCEL Standard 10 available from the DOW Chemical Company, nitrocellulose, PVB, acrylics, ketones, alkyds, maleics, cellulose derivatives, formaldehydes, rubber resins, phonolics, epoxides, poly vinyl butyral, fumarics, polyamides, hydrocarons, shellac, isocyanate-free polyurethanes, adhesion promoters, fragrances, fragrances, anti-foaming agents, or other additives. Generally, where resins 20 or binders are used, typical pigment (special effect and colored) 14, 16 to resin 20 ratios are about 1:1 to about 1:2.1. In some embodiments, resins 20 and additives are limited to result in a total solids content of the colored special effect ink 10 of less than 15% solids. The resin 20 or other additive can be added to the special effect premix, the colored premix, or to the combined special effect premix and colored premix, either alone or in the form of an additive premix. The amount or type of resin 20 or other additive present in the ink 10 can be adjusted to affect properties such as the drying time of the ink 10 and the amount of smearing of the ink 10 on the substrate 12.

To adjust the appearance of the colored special effect ink 10, the relative relationship of the special effect pigment 14 and the colored pigment 16 can be varied. Where more colored pigment 16 is incorporated in relation to the special effect pigment 14, the colored special effect ink 10 will have a more vivid, colored appearance, and vice versa.

In one embodiment, the colored special effect ink 10 includes a special effect 14 and a colored pigment 16 that is more hydrophobic than the special effect pigment 14. The colored pigment 16 is miscible in a solvent 18 chosen from the group consisting of alcohols, ethers, esters, ketones, and water. In another embodiment, the colored pigment 16 for use in the colored special effect ink 10 has a surface energy of less than 35 dynes/cm, and is miscible in a solvent 18 chosen from the group consisting of alcohols, ethers, esters, ketones, and water.

In yet another embodiment, a method of preparing a colored special effect ink 10 includes the steps of dispersing a special effect pigment 14 in a first solvent 18. A colored pigment 16 is surface treated to form a treated colored pigment 16, and the treated colored pigment 16 is more hydrophobic than the special effect pigment 14. The treated colored pigment 16 is dispersed in a second solvent 18 to form a colored dispersion. The special effect dispersion and the colored dispersion are combined to form the colored special effect ink 10.

EXPERIMENTS

Experiments 1-3

In the following experiments, aluminum pigments in isopropyl alcohol (IPA) were acquired in paste form, and were mixed with additional solvent IPA to form a special effect premix. Colored pigment (Renol Red F5RK-HW30) with sub-micron particle size (obtained in pigment content of approximately 50%) was incorporated into IPA to form a 30% solution using an air mixer at 1000 RPM for 30 minutes, to form a colored ink premix (with approximately 15% colored pigment). ETHOCEL Standard 4 Premium was dissolved in IPA using an air mixer at 100 RPM to prepare a resin premix with 18.5% solids. The special effect premix, colored premix, and resin premix were combined to form colored special effect inks.

The colored special effect inks were printed on various substrates, including lightweight coated (LWC) paper (with a Gurley porosity of 5854.4 seconds/100 mL) and multipurpose office paper (with a Gurley porosity of 12.2 seconds/100 mL). The porosity of the substrates was measured using a Profile Plus Technidyne Oil-Gurley meter. Additional features of the multipurpose office paper substrate include the following: basis weight of 0.76 g/m² (Basis Weight of Paper Substrates, TAPPI Test Method T410); thickness of 4 mils (Caliper of Paper Substrates, TAPPI Test Method T411); porosity of 1505 mL/min (Parker Print Surf Method at 1000 centipoise (cP) and 500 cP); roughness of 3.6-4.7 micron (for 500 cP and 1000 cP Parker Print Surf Method); contact angle, complete absorption of methylene iodide occurred within 9-17 seconds (FTA 200); surface energy of 38.7 dynes/cm (using Owens Wendt Method, first drip used for calculations).

In the first experiment, a 6.3% solution of the special effect pigment in IPA was prepared using the aluminum pigment EternaBrite 651-PA from Silberline for the special effect pigment. The special effect premix was combined with the resin premix, pigment premix and solvent as shown in Table 1 below.

TABLE 1

Colored Special Effect Ink using EternaBrite 651-PA

| Component | Dry Basis (g) | Actual Weight (g) |
|---|---|---|
| Special Effect Premix (EternaBrite 651-PA) | 6.3 | 9.0 |
| Resin Premix (Ethocel STD 4) | 13.4 | 72.43 |
| Colored Premix (Renol Red F5RK-HW30) | 3.3 | 11.0 |
| Solvent (IPA) | — | 7.57 |

In the second Experiment a 6.3% solution of the special effect pigment in IPA was prepared using the aluminum pigment SparkleBrite 011NL-PA from Silberline for the special effect premix. The special effect premix was combined with the resin premix, pigment premix and solvent as shown in Table 2 below.

TABLE 2

Colored Special Effect Ink using SparkleBrite 011NL-PA

| Component | Dry Basis (g) | Actual Weight (g) |
|---|---|---|
| Special Effect Premix (SparkleBrite 011NL-PA) | 6.3 | 9.6 |
| Resin Premix (Ethocel STD 4) | 13.3 | 72.4 |
| Colored Premix (Renol Red F5RK-HW30) | 3.3 | 11.0 |
| Solvent (IPA) | — | 7.0 |

In the third Experiment a 3% solution of the special effect pigment in IPA was prepared using the aluminum pigment StarBrite 4102-PA from Silberline for the special effect premix. The special effect premix was combined with the resin premix, pigment premix and solvent as shown in Table 2 below.

TABLE 3

Colored Special Effect Ink using StarBrite 4102-PA

| Component | Dry Basis (g) | Actual Weight (g) |
|---|---|---|
| Special Effect Premix (StarBrite 4102-PA) | 3 | 30 |
| Resin Premix (Ethocel STD 4) | 6 | 31.5 |
| Colored Premix (Renol Red F5RK-HW30) | 3.3 | 11.0 |
| Solvent (IPA) | — | 27.5 |

When the inks of Experiments 1-3 were printed on multipurpose paper, the colored pigment in the ink tended to seep through porous substrates when the viscosity of the ink was within the target range.

Experiment 4

In the following experiment, vacuum metalized aluminum pigment in isopropyl alcohol (IPA) was acquired in paste form, and was mixed with additional solvent IPA to form special effect premix. Powdered lithol rubine was used as the colored pigment. One sample of colored special effect ink was made by combining lithol rubine with IPA to form a colored premix, and adding the colored premix to the special effect premix. Additional samples of colored special effect ink were made by surface treating the colored pigment with oleic acid at two different levels, of 0.4% and 0.8%, respectively. The surface treated colored pigments were incorporated into IPA to form two colored premixes. The colored premixes were then added to the special effect premix, and the resulting colored special effect inks with treated colored pigment were printed using a drawdown method on porous substrate. Both of the inks with surface treated colored pigments had less bleed through than the ink with the untreated colored pigments. The colored pigment that was surface treated with the higher level of oleic acid (0.8%) had less bleed-through when printed on the porous substrate than the colored pigment that was surface treated with the lower level of oleic acid (0.4%).

Experiment 5

In the following experiment, vacuum metalized aluminum pigment in isopropyl IPA was acquired in paste form, and was mixed with additional solvent IPA to form special effect premix. Low viscosity BRO-CW4 pigment available from KOBO was surface treated with carnauba wax, and used to form colored premix. The colored premix was added to the special effect premix to form a colored special effect ink. The colored special effect ink was printed using a drawdown method on a porous substrate. The printed colored special effect ink had a desired colored metallic appearance. Carnauba wax was also used to surface treat Macatawa Red Dry Toner colored pigment, Renol Red F5RK-HW30.

It is also important to note that the construction and arrangement of the elements of the composition as shown and described in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A colored special effect ink, comprising:
   a special effect pigment; and
   a colored pigment, wherein the colored pigment is selected and/or treated to be more hydrophobic than the special effect pigment to define (create) a difference in hydrophobicity sufficient to inhibit bleed through of the colored pigment from a top side of a porous substrate to a bottom side of a porous substrate when the colored special effect ink is printed on a top side of the porous substrate, and wherein the colored pigment is miscible in a solvent chosen from the group consisting of alcohols, ethers, esters, ketones, and water.
2. The colored special effect ink of claim 1, wherein:
   the special effect pigment comprises a metallic pigment.
3. The colored special effect ink of claim 2, wherein:
   the special effect pigment comprises a metallic pigment chosen from the group consisting of aluminum, mica, bronze, copper, and silver.
4. The colored special effect ink of claim 3, wherein:
   the special effect pigment comprises aluminum pigment that is at least one of leafing, non-leafing and vacuum metalized pigments.
5. The colored special effect ink of claim 1, wherein:
   the colored pigment has a particle size of less than 10 microns.
6. The colored special effect ink of claim 5, wherein:
   the colored pigment has a particle size of less than 5 microns.
7. The colored special effect ink of claim 6, wherein:
   the colored pigment has a particle size of less than 1 micron.
8. The colored special effect ink of claim 1, wherein:
   the colored pigment has a surface energy of less than 45 dynes/cm.
9. The colored special effect ink of claim 8, wherein:
   the colored pigment has a surface energy of less than 35 dynes/cm.
10. The colored special effect ink of claim 1, wherein:
    the colored pigment is surface treated with a hydrophobic material comprising 1% to 50% of the weight of the colored pigment to which it is applied.
11. A method of preparing a colored special effect ink, comprising:
    dispersing a special effect pigment in a first solvent to form a special effect dispersion;
    surface treating a colored pigment utilizing a first hydrophobic surface treatment compound to form a hydrophobically treated colored pigment, wherein the hydrophobically treated colored pigment is more hydrophobic than the special effect pigment;
    followed by dispersing the hydrophobically treated colored pigment in a second solvent to form a colored dispersion; and
    combining the special effect dispersion and the colored dispersion.
12. The method of claim 11, wherein:
    the special effect pigment comprises a metallic pigment.
13. The method of claim 11, wherein:
    the colored pigment has a surface energy of less than 35 dynes/cm.
14. The method of claim 11, wherein:
    the first hydrophobic surface treatment uses a compound having an aliphatic tail having a first length; and
    the special effect pigment is surface treated with a second hydrophobic treatment compound having an aliphatic tail having a second length that is at least one carbon atom shorter than the first length.

15. The method of claim 14, wherein:
the compound from the first hydrophobic surface treatment comprises a fatty acid having an aliphatic tail with more than 20 carbon atoms.

16. The method of claim 11, including:
grinding the hydrophobically treated colored pigment to reduce a particle size of the hydrophobically treated colored pigment.

17. The method of claim 16, wherein:
an ultra-sonication process is used to grind the hydrophobically treated colored pigment.

18. The method of claim 11, wherein:
the hydrophobic surface treatment compound comprises carnauba wax.

* * * * *